Dec. 24, 1940.    J. H. KRIECK    2,226,405
VALVE
Filed Feb. 18, 1938
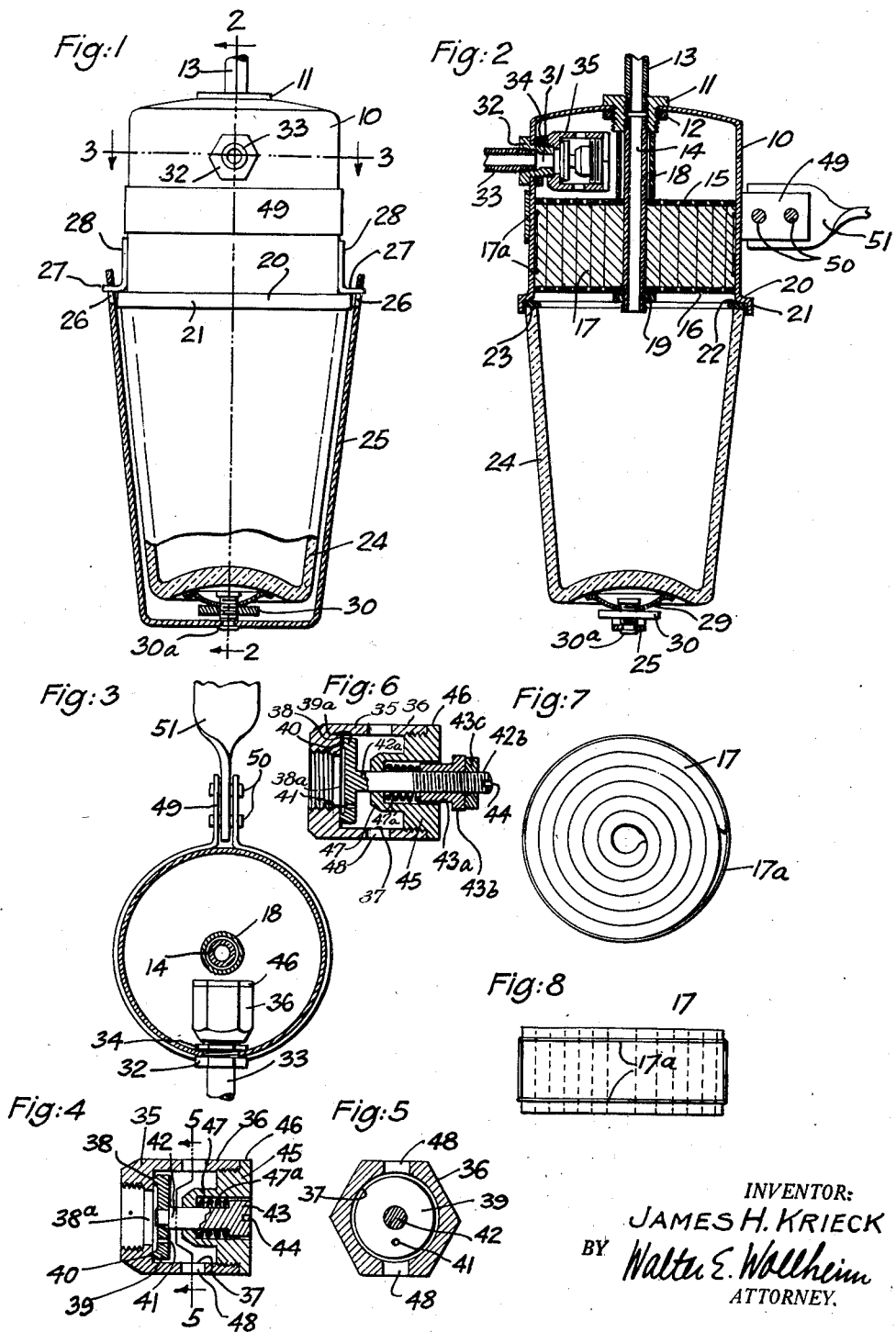
INVENTOR:
JAMES H. KRIECK
BY Walter E. Wollheim
ATTORNEY.

Patented Dec. 24, 1940

2,226,405

UNITED STATES PATENT OFFICE 2,226,405

VALVE

James H. Krieck, Roselle Park, N. J.

Application February 18, 1938, Serial No. 191,150

1 Claim. (Cl. 251—120)

This invention relates to apparatuses for increasing the efficiency of internal combustion engines and it is one of the principal objects to provide an improved valve structure for the apparatus for which Patent #1,990,657 was granted to applicant on February 12, 1935.

In this patent a valve structure was disclosed for the purpose of minimizing variations in suction from the manifold within the housing of the apparatus. It is one of the objects of the invention to so locate these means that they cannot be tampered with. Another object is to provide these means in a valve unit of simple construction which is easily applied to the housing and which can be manufactured economically. Still further objects will become apparent after a perusal of the following specification and an inspection of the accompanying drawing in which a preferred embodiment of the invention is shown.

In the drawing:

Fig. 1 is an elevational front view of the apparatus embodying the principles of my invention;

Fig. 2 is a vertical cross-sectional view along the plane of line 2—2 in Fig. 1;

Fig. 3 is a horizontal sectional view partly in elevation along the plane of line 3—3 in Fig. 1;

Fig. 4 is an enlarged vertical sectional view of the suction valve structure;

Fig. 5 is a vertical cross-sectional view along the plane of line 5—5 in Fig. 4;

Fig. 6 is an enlarged vertical sectional view of a modified construction of the suction valve; and Fig. 7 is a plan view and Fig. 8 an elevational view of a preferred form of filter element.

Like characters of reference denote similar parts throughout the several views and the following specification.

10 is a cylindrical housing, preferably made of a sheet metal stamping having a socket 11 through its closed top fastened to it by means of a jam nut 12. The inside of socket 11 is tapped to receive an inlet tube 13 at its top and a filter tube 14 at its bottom.

15 is an upper perforated disc and 16 is a lower perforated disc, holding a filter element 17 between them. The upper disc 15 is held in fixed spaced relation to the top of the housing 10 by a cylindrical bushing 18 between the socket 11 and the disc 15 and placed over the filter tube 14. The lower disc is held in position on the tube 14 and clamped against the filter element 17 by a nut 19 screwed upon the threaded lower end of the tube 14.

The filter element 17 is preferably made of folded sheets of crepe absorbent paper, crinkled lengthwise, and wound lengthwise around the filter tube 14 and held together by strings 17a.

The lower open end of the housing 10 is flanged outwardly at 20 and downwardly at 21 to provide a seat 22 for a gasket 23. 24 is a glass cup having its open end bearing against the gasket 23. 25 is a substantially U-shaped flat metal frame, having its upper ends slotted at 26 to slip over outwardly extending ears 27 of lugs 28 welded or otherwise fastened to the sides of the housing 10.

29 is a cup-shaped spring bearing against the bottom of the glass 24 and adapted to be pressed against it and so secure the glass to the housing, by turning a nut 30 upon a screw riveted to the bottom portion of the frame 25.

31 is a cylindrical socket at the side of the housing 10 and above the upper disc 15 having a flange 32, and being threaded interiorly to receive an outlet tube 33 and being threaded exteriorly but within the housing for a jam nut 34 which holds the socket tightly against the wall of the housing when drawn towards the flange. The exteriorly threaded part of the socket 31 is sufficiently long to receive a threaded part of a valve body 35. This valve body is preferably of hexagonal outer shape at 36 and bored out interiorly at 37 of a diameter larger than its threaded portion which is screwed upon the socket 31, thus forming a flat valve seat 38 surrounding a valve opening 38a. 39 is a substantially flat valve disc having a raised seat portion 40, and a small hole 41 drilled through it. The outer diameter of the valve disc 39 is somewhat smaller than the bore 37. A round center stem 42 is riveted to the disc 39. 43 is a head of the stem 42 of larger diameter and provided with a screw driver slot 44 at its outer face. 45 is a cap screwed into a correspondingly threaded end of the body 35, having a hexagonal flange 46 contacting with the end of the body and a cylindrical projection 47 within it. Cap 45 is bored out centrally to slidingly receive the valve stem 42 and is further bored out somewhat larger to receive the head 43 of the stem. 47a is a helical spring in this larger bore, resting on its bottom and against the underside of head 43. 48 are holes passing transversely through the walls of the valve body.

49 is a circularly formed metal strip around the housing 10 fastened by means of screws or bolts 50 to a support bracket 51.

The method of operation and application of the device is as follows:

The pipe 33 is connected to the inlet manifold of the engine to which the device is applied, and the pipe 13 preferably to the upper part of the crank case at any convenient point above the oil sump. When the engine is placed in operation, a suction is set up in the intake manifold. This suction is communicated by means of tube 33, past valve seat 38 and the space between the outside of disc 39 and the inside of bore 37 and openings 48 into the upper part of housing 10, thence through the perforations in discs 15 and 16 and the filter element 17 confined therebetween to the glass cup 24, through the inside of tube 14 to the inlet tube 13, and thus to the body of air and vapors in the crank case of the engine above the oil sump.

By means of this suction, the air and vapors and other light particles of dust, carbon, sludge, water vapor and gasolene seepage past the piston rings, impurities in the lubricating oil and so forth, are drawn into the device by means of tube 13, where they enter through the tube 14 into the glass cup 24. The heavy particles and impurities in these vapors or gases, such as water, heavy carbon, sludge, dirt, and the like, drop by gravity into the empty cup 24, accumulating at the bottom thereof. The lighter impurities, in addition to the volatile fumes, moisture or steam and lubricating film are then drawn by the suction through the disc 16 where the light solid impurities are intercepted by the filter element 17. The strained or purified gases and vapors are then further drawn through the top disc 15, openings 48, around the valve disc 39, past valve seat 38 and tube 33 into the intake manifold, thus admitting into the engine through the manifold a spray or mist of minute particles of oil or oil vapor which in turn will be deposited on the valve stems, compression rings, cylinder walls, and pistons thus greatly aiding their lubrication. Moisture or water vapor drawn from the crank case will enter the intake manifold and will be deposited in the explosion chamber forming steam, thus reducing the formation of carbon. Fuel gases which would otherwise be wasted are cleaned and mixed with the air drawn into the manifold, thereby enriching the mixture and greatly improving the efficiency of performance of an engine employing the device.

The automatic control device for the suction is very simple in operation. At normal operation when there is the highest vacuum in the line 33 between the inlet manifold and the valve body 35, valve 39 contacts with the seat 38, leaving port 41 as the only means of communication between the intake manifold and the inner part of the housing. Should there be a sudden decrease in suction or vacuum, the valve 39 will be forced by the tension of the spring 47 away from its seat 38 thus opening the space between valve 39 and seat 38 and proportionately increasing the suction within the device. As soon as the suction is restored to normal, the opening between valve 39 and seat 38 is again automatically decreased, or closed. The suction can never be entirely shut off from the inner part of the housing 10 on account of the small passage 41 through the valve 39. Thus the suction within the housing is kept at a uniform degree. Attention is also drawn to the fact that in the valve structure, as disclosed, the valve stem 42 with the disc 39 and head 43 which are assembled with cap 45 and the spring 47 between the head and the cap forms one unit which can readily be removed from the valve body 35 for replacement or other purposes.

In the modification of the suction valve member shown in Fig. 6, the valve disc 39a is made integral with the stem 42a. The end of the valve stem is threaded at 42b and also provided with a screw driver slot 44 for regrinding purposes. A bushing 43a having a polygonal head 43b is screwed onto the threaded end 42b of the stem and is held there by a lock nut 43c. By this arrangement the tension on the spring 47a can be varied and the valve be adjusted, if desired, to different degrees of suction, depending upon the type of engine or vehicle the device is to be used on. All other parts of this modified valve are identical with the construction shown in Figs. 4 and 5 and bear the same reference numbers.

The entire filter can readily be removed, cleaned and replaced. Should the glass cup 24 be nearly full, it is only necessary to disconnect it from the housing 10 by removing the metal frame 25 around the glass by disengaging it from ears 27.

The position of the valve in the upper part of the housing and extending within the same assures lubrication of all the wearing parts of the valve and furthermore prevents unauthorized tampering with it. The valve being clean at all times and protected from road dust or other impurities results in reliable operation.

It is obvious that many changes in the construction of the apparatus may be made. So, for instance, the entire housing may be made an integral casting with the manifold or any part of the motor block. The device is, of course, equally applicable to Diesel engines and is not restricted to application to gas engines.

Various other changes of form, proportions and minor details of construction may be resorted to without departing from the principles or sacrificing any of the advantages of the invention as defined in the appended claim.

What I claim as new, is:

An automatic valve within the housing of a device of the kind described for the purpose of minimizing within the housing of such a device variations in suction from the inlet manifold of an engine, comprising a casing of substantially polygonal outer shape having a valve opening threaded at one end for connection to a pipe and having a valve seat surrounding it at the other end, a valve disc having a raised portion to engage the said valve seat for the purpose of closing the said opening and having a by-pass port, a stem for the disc having a threaded end, a cap fastened to the casing having an outer polygonal shape and having the said stem in sliding engagement with a hole through its center, the said threaded end of the stem projecting partially outside of the said cap, a gland and a lock nut in engagement with the threaded end of the said stem, the said gland comprising a polygonal head and a round extension, the said extension projecting into a round recess in the said cap concentrically with the said hole in the cap, a coiled spring between the bottom of the said recess and the said extension tending normally to keep the said disc away from its seat, the said casing having transverse ports through its wall, the said cap, spring, stem, gland and lock nut being removable from the said casing as a unit, and the said gland being adjustable upon the said stem for varying the tension upon the said spring.

JAMES H. KRIECK.